An exemplary embodiment of the invention is shown in the accompanying drawings wherein:

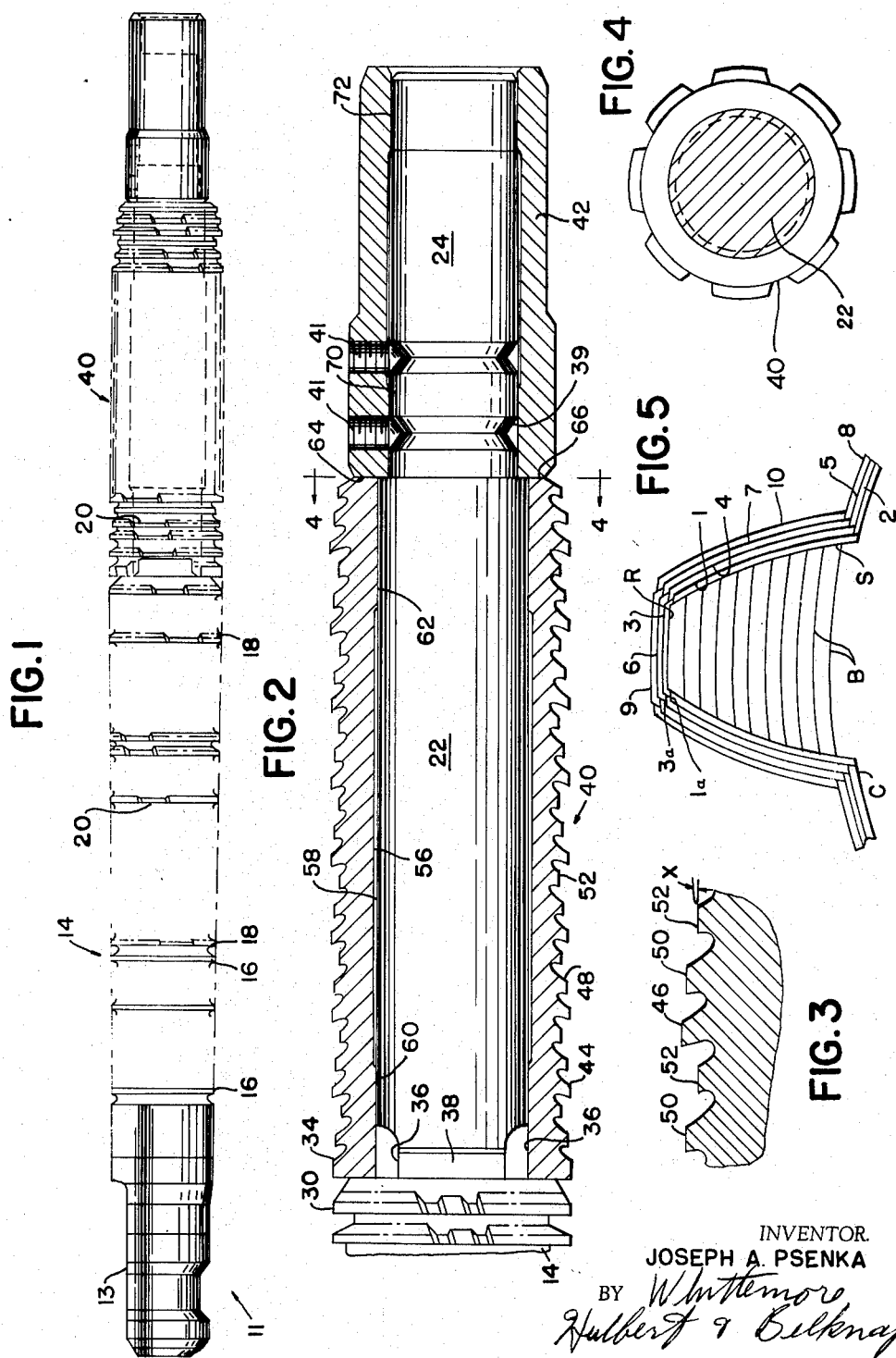

United States Patent Office 3,231,962
Patented Feb. 1, 1966

3,231,962
CONCENTRICITY BROACH
Joseph A. Psenka, Bloomfield Hills, Mich., assignor to National Broach & Machine Company, Detroit, Mich., a corporation of Michigan
Filed Dec. 28, 1964, Ser. No. 421,357
20 Claims. (Cl. 29—95.1)

The present invention relates to a finishing broach and more particularly, to a broach assembly comprising a plurality of sections a leading one of which is a roughing section adapted to rough out, or finish roughing out, the teeth of an internal gear or splined element, and a following section which is a finishing section adapted to finish the teeth of the work piece with extreme accuracy as regards to profile, size and more particularly, concentricity. The finishing teeth of the broach are constructed and shaped so that they broach or cut the minor or inside diameter, the pitch diameter or form, and the outside or major diameter of the work piece with assured concentricity.

In the broaching of internally toothed members such as internal gears, spline members or the like, it is desirable to produce broaching elements having substantially any required degree of accuracy. However, in use such a broaching element can reproduce itself with substantial accuracy only when it is not subjected to negative factors which are occasioned by an earlier state of a broaching operation and are more fully explained in my copending application Serial No. 381,616, entitled "Broach," filed July 7, 1964.

The present invention relates to a broach which has a roughing section and a finishing section which can either be an integral part of the broach, in other words, a solid one-piece broach, or have a replaceable finishing shell which is affixed to and located on the rear end of the broach body following the roughing section, such as disclosed in my Patent 2,987,801. Certain aspects of the invention may be embodied in a finishing broach construction, whether formed as a part of a broach including the finishing construction, or formed as a separate broach. It will be appreciated also that the cutting teeth of the broach may be arranged in axial alignment if the broach is for the purpose of producing splines or gears with zero degree helix angle (spur), or arranged in helical alignment if the broach is for the purpose of producing helical teeth.

During the rapid development of the broaching art, it has always been the ultimate goal of the industry to provide for concentricity of the major and minor diameters of the broach part with the pitch or form diameter regardless of whether the form of the broach be an involute spline, straight-sided spline, angular spline, or a special form spline, either helical or spur. Although it has always been the objective in the industry to obtain concentricity in the broached part between the major and minor diameters and form, the ultimate objective has not been obtained. The present invention arranges the finishing teeth and annular blades of the broach in a predetermined manner or sequence to assure concentricity of the elements of the work piece.

It is an object of the present invention to provide a broach which obtains the desired concentricity in the broached part between the pitch diameter or form and the major and minor diameters (outside and inside diameters respectively).

Another object of the present invention is to provide a broach comprising a finishing section having a plurality of toothed blades providing finishing series of longitudinally aligned alternate finish top and side cutting teeth adapted to pass through spaces formed in a work piece by a preceding series of broach teeth and a plurality of progressively radially stepped round cutting blades, the finish cutting teeth being arranged in laterally aligned groups which comprises groups of top cutting teeth and side cutting teeth interspersed in a predetermined sequence, the round blades being interspersed between pairs of adjacent groups of top cutting teeth and side cutting teeth, the top cutting teeth in each series being of definitely predetermined increasing height in the rearward direction to trim the major diameter of a work piece, with the width of each of the top cutting teeth in a series being smaller in width than the preceding side cutting tooth in the same series to have side clearance with respect to the work piece, the side cutting teeth in each series being of definitely predetermined progressively increasing width in the rearward direction to trim the profile of a work piece, with the height of the side cutting teeth in each of the corresponding groups being of less height than the preceding group of top cutting teeth, corresponding edges at both sides of each of the side cutting teeth being circumferentially stepped and shaped so as to cause each of the side cutting teeth to cut at both sides thereof simultaneously throughout substantially their entire height, the round blades providing a final trimming operation on the minor diameter of a work piece.

It is another object of the present invention to provide a broach as described in the preceding paragraph in which at least one of each of the three types of blades is engaged in the work piece simultaneously.

Still another object of the present invention is to provide a broach of the aforementioned type in which the sequence of groups of side cutting and top cutting teeth is such that a pair of adjacent groups of either kind of cutting teeth is separated by no more than one group of the other kind of cutting teeth and one round blade.

It is a further object of the present invention to provide a broach of the aforementioned type in which the sequence of groups of side cutting and top cutting teeth is such that a pair of adjacent groups of top cutting teeth is separated by no more than one group of side cutting teeth and one round blade.

It is a further object of the present invention to provide a broach of the aforementioned type in which said finish top and side cutting teeth have side clearance in back of the cutting edges.

It is a further object of the present invention to provide a broach of the aforementioned type in which the sides of the finishing teeth are of gear tooth form.

It is still another object of the present invention to provide a broach of the aforementioned type in which the sides of said finishing teeth are of involute form.

It is a further object of the present invention to provide a broach of the aforementioned type in which the finishing section is elongated and in which the teeth and blades are provided on its exterior to broach teeth and spaces in an opening in a work piece.

It is a further object of the present invention to provide a broach of the aforementioned type in which the pitch of said blades and annular groups is substantially less than one-half the thickness of a work piece for which the broach is designed.

It is a further object of the present invention to provide a broach of the aforementioned type wherein the finishing teeth are located on a shell which is connected to and follows a roughing section of the broach.

It is a further object of the present invention to provide a simplified low cost structure of the aforementioned type having certain advantages contributing to efficiency, reliability and long life as well as ease of maintenance.

Other objects and features of the invention will become apparent as the description proceeds, especially when taken in conjunction with the accompanying drawings, illustrating a preferred embodiment of the invention, wherein:

FIGURE 1 is a side elevation of the broach assembly.

FIGURE 2 is an enlarged fragmentary sectional view through the trailing end of the broach assembly.

FIGURE 3 is a side elevation showing the profile of adjacent teeth in the finishing section, taken on the line 3—3, FIGURE 1.

FIGURE 4 is a view partly in section, taken on the line 4—4, FIGURE 2.

FIGURE 5 is a diagrammatic view of a tooth space in a work piece showing the sequence of cuts taken by the teeth of the roughing and finishing sections of the broach shown in FIGURE 1.

In accordance with the present invention, teeth of a work piece are roughed out, as for example by a separate roughing broach or a roughing section on a combined roughing and finishing broach.

The broach 11 comprises a leading and roughing section provided on the leading end thereof with a head 13 adapted to be connected to a suitable device for pulling the broach 11 through a hole in the work piece, the teeth of which were previously partially roughed out by the roughing broach. Conveniently, the roughing section of the broach 11 as indicated generally at 14 in FIGURE 1, includes a series of progressively stepped annular or round blades 16, as for example, ten in number. Thereafter follows a series of progressively stepped blades 18, as for example, seventy in number. The blades 18 are interrupted to form separate cutting teeth 20 which increase in height in the rearward direction. It will be appreciated that the cutting teeth 20 are arranged in axial alignment if the broach is for the purpose of producing spur teeth, or in helical alignment if the broach is for the purpose of producing helical teeth. The term "longitudinal alignment" or the like is intended to cover arrangements for both the spur and helical arrangements of the teeth. At the following end of the roughing section 14 of the broach assembly 11 is a cylindrical support 22 having a reduced portion 24 which is utilized for a purpose which will subsequently appear.

Directly in rear of the final toothed blade 30 of the roughing section 14 the broach has a short section larger than the cylindrical portion 22 which is machined to form rearwardly facing flat abutment surfaces 34 and radially outwardly facing flat surfaces 36. This arrangement provides a flat transversely extending key 38.

As seen in FIGURE 2, the following finishing broach section or shell 40 is assembled on the cylindrical support 22 of the leading section 14 and is retained thereon in assembled relation by a retainer 42 carried by the reduced portion 24 of the roughing or leading broach section 14 and locked in place by a plurality of locking screws 41. The screws 41 are received in annular grooves 39 provided in the support 24. The detailed construction of the finishing section 40 is best seen in the sectional enlargement in FIGURE 2 and the end view of the finishing section seen in FIGURE 4. The finishing section or shell 40 is essentially tubular in shape having toothed cutting blades 44 forming longitudinally aligned series of top cutting teeth 46; toothed cutting blades 48 forming longitudinally aligned series of side cutting teeth 50; and annular round blades 52. The teeth 50 are side backed-off and increase in tooth width as a progression is made from the front to rear of the shell 40. Again, the cutting teeth 46 and 50 extend in axially disposed series if the broach 11 is to form a spur member, and the series are helically aligned if the broach 11 is used to produce helical teeth on the work piece.

At its leading end the finishing section 40 is provided with a notch or keyway extending diametrically across the leading end thereof and dimensioned to receive the key 38 at the following end of the roughing section 14 of the broach 11. The finishing section or shell 40 is provided with a central opening 56 the intermediate portion of which is enlarged to provide clearance as indicated at 58 and the ends of which are of slightly reduced size to provide the guide surfaces 60 and 62 which are guidingly received on the cylindrical outer surface of the cylindrical support 22 of the roughing section 14 of the broach.

It will be observed that the retainer 42 in assembly has its forward end 64 engageable with the annular shoulder 66 provided on the extreme end of the shell 40. The retainer 42 is provided on the interior thereof with a pair of cylindrical surfaces 70 and 72 which are adapted to snugly engage the reduced end portion 24 of the roughing section 16 of the broach.

The retainer 42 as is indicated in FIGURE 2, is connected to the reduced portion 24 of the cylindrical support 22 and is located in a position so as to substantially clamp or fix the shell 40 against circumferential and axial movement. The abutment surface 64 provided on the retainer 42 is effective to urge the shell 40 to the left as viewed in FIGURE 2 so as to urge the leading end of the shell 40 against the abutment surfaces 34 provided on the roughing section 16. It should be appreciated that the broach 11 may be constructed and arranged to provide for a floating shell of the type described in my aforesaid patent. Alternatively, of course, the teeth and blades 46, 50 and 52 may be formed at the trailing end of a solid one-piece broach.

The finishing teeth 46 and 50 are arranged in series which are in longitudinal alignment with the series of teeth 20 provided on the roughing section 14. The top finishing teeth 46 as well as the side finishing teeth 50 are fromed on blades and hence are arranged in laterally or circumferentially aligned groups or units, said units comprising sequenced groups of top cutting and side cutting teeth. Following a group of top cutting teeth 46 and a group of side cutting teeth 50 is an annular or round blade 52.

It will be appreciated that in order best to obtain concentricity between the three elements of the work piece at least one blade of each type 44, 48 and 52 should be cutting simultaneously in the work piece. The pitch of the blades and the finish cutting teeth are substantially less than one-half the thickness of the work piece for which the broach is designed so that the round blades and finish cutting teeth are cutting simultaneously. Moreover, when thin work pieces are being broached, a plurality will normally be clamped together to increase the effective width or thickness thereof.

The teeth of the finishing section are backed-off as is indicated by the angle X in FIGURE 3. The amount of backoff will vary from ¼ degree to 1½ degrees, with the backoff extending down to the body diameter.

Referring now to FIGURE 5, there is illustrated an example of a tooth space broached into the work piece by the teeth of the finishing section or shell 40 of the broach. It is assumed that the contour of the hole as broached by preceding broach teeth, either on a section immediately preceding the finishing section 40 or if desired, at least partly by a separate broach, is such that the tooth spaces, prior to the finishing operation, have side surfaces S, root surfaces R, and crest surfaces C. The material of the tooth space will have been broached in a conventional nibbling operation, with cuts taken to increasing depth as indicated by lines B by teeth of increasing height. It is desired to remove material from the surfaces C, R and S in such a way that all three of these surfaces when completely machined are substantially exactly concentric. In order to accomplish this it is necessary to take cuts in sequence on different surfaces so that these surfaces are being cut simultaneously. It will be apparent that if a broach could be designed in which a single blade cuts simultaneously on the surfaces C, R and S, then all of these surfaces would exhibit the same concentricity as the broach. However, if the broach is divided into sections such that a first series of round uninterrupted blades broaches the surface C to the required dimension and theerafter, a second section of the broach broached the surfaces S to the required dimension, and finally a third section broached the surfaces R to the required dimension there would be nothing to prevent lateral or rotational drift of the broach so that the finished broach would exhibit eccentricity as between two or more of these surfaces.

It is of course impossible to broach all of the surfaces simultaneously by a single blade due to the problems of chip interference and disposal. In accordance with the present invention however, adjacent blades are caused to cut on different surfaces and are arranged such that at least two of the three different types of blades are engaged in the work piece and are cutting simultaneously. This insures substantially exact concentricity between the finished sections and at the same time avoids problems of chip interference and disposal.

While the number of teeth on the finishing section may be relatively large, the principles involved are well illustrated in FIGURE 5 where the relationship between a relatively limited number of blades is suggested. As seen in this figure, the first blade of the finishing section is provided with teeth adapted to remove material only from the sides of the tooth space along the line 1. For this purpose the tooth on the first side cutting blade 48 is in longitudinal alignment with the tooth space defined by the surfaces R and S but is somewhat wider so that it will cut at both sides of the space, as indicated in the figure. Moreover, the teeth are of a height somewhat less than the depth of the tooth space so that top clearance is provided during the cutting of the first side cutting tooth except for the negligible surface designated at 1a in FIGURE 5.

The next cut is performed by a round uninterrupted blade 52 which takes the cut along the line indicated at 2 in FIGURE 5.

The next cut which will be performed in the tooth space is at the bottom of the tooth space or along the line 3. The top cutting tooth 46 which performs this cutting operation is of a height somewhat greater than the depth of tooth space. The tooth however, is somewhat narrower than the preceding side cutting tooth so that it has side clearance and cuts only on the top except for the negligible area 3a.

Thereafter, the blades of the finishing section of the broach are arranged to take in sequence side cuts along the line 4, circular cuts along the line 5, bottom cuts along the line 6, side cuts along the line 7, circular cuts along the line 8, bottom cuts along the line 9, and side cuts along the line 10.

It will be observed that each of the side cuts 1, 4, 7 and 10 extend for substantially the full depth of the tooth space as thus far finished, and therefore are adapted to provide what is referred to as full-form finishing. This type of cutting produces accurate side surfaces on the teeth of the finished part which are perfectly smooth and are held to the accuracy ground into the broach.

In the illustrated example it will be observed that there has been illustrated a certain sequence of cuts. Using the initials S for a side cutting operation, C for a circular cutting operation at the minor diameter of the part, and R for a root cutting operation at the major diameter of the part, it will be apparent that the illustrated sequence is SCRSCRSCRS.

It is to be understood that this exact sequence is not required and a sequence of SRCSRC, etc. would be equally useful. At the same time, the first cut taken by the finishing section may be either on the side, the root, or a circular cut at the minor diameter of the piece so that the sequence of cuts may begin with a cut of any of the three types.

Moreover, while there are advantages in insuring that any three consecutive blades include one blade of each of the three types, this is not a firm requirement and a sequence of cuts such for example as SRCRCSRC, etc. may be satisfactory. Similarly, sequences such as SCRCRSCR, etc. may be satisfactory. The important consideration is that the different types of blades be interspersed in a sequence which insures that at the very minimum two blades of different types are cutting simultaneously in a work piece. Preferably, the arrangement is such that at least one of each of the three types of blades is engaged simultaneously in cutting in the work piece.

Reference is made herein to a finishing section. This terminology has been adopted because this section is adapted to perform a series of finishing cuts to bring the work piece to the exact dimension and surface finish required. It is recognized that in the past the term "finish section" has some times been applied to a section of a broach in which the teeth are all of the same size so that as the broach is resharpened in use, the leading teeth of this section are sequentially reduced in size, throwing the final finishing action back onto a following tooth. In the present invention the use of two or three, or even more, teeth of identical size at the following end of a new broach is contemplated if desired, but the finishing section as defined includes the stepped teeth adapted to take the fine or relatively light finishing cuts disclosed herein. As a specific example, the blades 52 and teeth 46 and 50 may be stepped to take cuts decreasing in depth from about 0.0015 to 0.0005 inch, with the last few teeth and blades of each type identically dimensioned.

Briefly reviewed, the maintainence of concentricity between the pitch diameter (PD), the outside diameter (OD), and the inside diameter (ID) of the part is brought about by having blades of each type always engaged in the work piece, or assembly of work pieces. If the work piece is of minimum size, this may require the blades to be in sequence such that every group of three consecutive blades contains one blade of each type.

In some cases it is not necessary to maintain concentricity between all three diameters, in which case the blade sequence may be altered accordingly. For example, a particular splined work piece may be supported on the ID (minor diameter) of spline teeth in a central hole for machining external teeth on the part, and may have these external teeth checked while similarly supported. However, in assembly the part may locate on the PD. In this case concentricity is particularly required between PD and ID, and these blades may be alternated for best results, or at least arranged so that at least one PD cutting blade and one ID cutting blade are always engaged in the work piece.

While the disclosure is of an external broach designed to broach internal gears or splines, it is of course apparent that the teeth of an internal or pot broach may be similarly formed to obtain the high accuracy in concentricity characteristic of the present invention.

Although this invention has been described in connection with a shell type of broach, it should be understood that it could be utilized in connection with a solid type of broach. In addition, the invention is applicable to splines or gears with a zero degree helix angle (spur) or to helical broaches as well. While the tooth form illustrated is a generally parallel flat sided spline, the form of teeth may be as desired, including involute.

The drawings and the foregoing specification constitute a description of the improved broach in such full, clear, concise and exact terms as to enable any person skilled in the art to practice the invention, the scope of which is indicated by the appended claims.

What I claim as my invention is:

1. A broach comprising a leading roughing section having a plurality of series of longtiudinally aligned cutting teeth arranged in laterally aligned groups, the cutting teeth in each series increasing in height in the rearward direction, a following finishing section having a plurality of blades, some of said blades being notched to provide series of accurately formed longitudinally aligned finish top and side cutting teeth interspersed in predetermined sequence in longitudinal alignment with the series of teeth in said roughing section, the remainder of said blades being progressively radially stepped round cutting blades, said blades being interspersed in a predetermined sequence so that at least two blades of different types are engaged in cutting at all times, the top cutting teeth in each series of the finishing section being of definitely predetermined increasing height in the rearward direction to trim the bottom of a tooth space of a work piece, with the width of each of the top cutting teeth in each series of the finishing section being less than the width of the preceding side cutting teeth of the same series to have side clearance with respect to the work piece, the side cutting teeth in each series of the finishing section being of definitely predetermined progressively increasing width in the rearward direction to trim the sides of the teeth of a work piece, with the height of each of the side cutting teeth in each series being of less than the height of the preceding top cutting teeth in the same series, corresponding edges at both sides of each of said finish side cutting teeth being circumferentially stepped and shaped so as to cause each of said side cutting teeth to cut at both sides thereof simultaneously throughout substantially its entire height, said round blades providing a final trimming operation on the crests of the teeth of a work piece.

2. A broach as defined in claim 1 in which the sequence of blades is such that at least one blade of each type is engaged in cutting at all times.

3. A broach as defined in claim 1 in which the sequence of blades having side cutting and top cutting teeth is such that a pair of blades of either kind is separated by no more than one blade of the other kind and one round blade.

4. A broach as defined in claim 1 in which the sequence of blades having side cutting and top cutting teeth is such that a pair of blades of top cutting teeth is separated by no more than one blade having side cutting teeth and one round blade.

5. A broach as defined in claim 1 in which the sequence of blades is such that throughout the major portion of the broach, any group of three consecutive blades contains one of each of the three different types of blades.

6. A broach as defined in claim 1 in which said finish top and side cutting teeth have side clearance in back of the cutting edges.

7. A broach as defined in claim 1 in which the teeth of the roughing section are of equal width at measuring points radially spaced equal distances from the axis of the broach.

8. A broach as defined in claim 1 in which the pitch of the blades and finish cutting teeth is substantially less than one-half the thickness of a work piece for which the broach is designed so that round blades and finish cutting teeth are cutting simultaneously.

9. A broach as defined in claim 1 in which the sides of said finish cutting teeth are of gear tooth form.

10. A broach as defined in claim 1 in which the sides of said finish cutting teeth are of involute form.

11. In a broach, a finishing section having a plurality of blades, some of said blades being notched to provide finishing series of longitudinally aligned finish top and side cutting teeth adapted to pass through spaces formed in a work piece by a preceding series of broach teeth, the remainder of said blades being progressively radially stepped round cutting blades, said finish cutting teeth being arranged in longitudinally aligned series which comprises series of top cutting teeth and side cutting teeth interspersed with said round blades in a predetermined sequence so that at least two blades of different types are engaged in cutting at all times, the top cutting teeth in each series being of definitely predetermined increasing height in the rearward direction to trim the bottom of the tooth spaces of a work piece, with the width of each of the top cutting teeth in a series being smaller in width than the preceding side cutting tooth in the same series to have side clearance with respect to the work piece, the side cutting teeth in each series being of definitly predetermined progressively increasing width in the rearward direction to trim the sides of the teeth of a work piece, with the height of each side cutting tooth being of less than the height of the preceding top cutting tooth in the same series, corresponding edges at both sides of each of said side cutting teeth being circumferentially stepped and shaped so as to cause each of said side cutting teeth to cut at both sides thereof simultaneously throughout substantially its entire height, said round blades providing a final trimming operation on the crests of the teeth of a work piece.

12. A broach as defined in claim 11 in which the sequence of blades is such that at least one blade of each type is engaged in cutting at all times.

13. A broach as defined in claim 11 in which the sequence of groups of side cutting and top cutting teeth is such that adjacent groups of either kind of cutting teeth are separated by no more than one group of the other kind of cutting teeth and one round blade.

14. A broach as defined in claim 11 in which the sequence of groups of side cutting and top cutting teeth is such that adjacent groups of top cutting teeth are separated by no more than one group of side cutting teeth and one round blade.

15. A broach as defined in claim 11 in which the sequence of groups of side cutting and top cutting teeth and blades is such that throughout at least the major portion of said broach, any group of three longitudinally consecutive blades contains one of each of the three different types of blades.

16. A broach as defined in claim 11 in which said finish top and side cutting teeth have clearance in back of the cutting edges.

17. Structure as defined in claim 11 in which the sides of said finishing teeth are of gear tooth form.

18. Structure as defined in claim 11 in which the sides of said finishing teeth are of involute form.

19. Structure as defined in claim 11 in which said finishing section is elongated and in which said teeth and blades are provided on its exterior to broach teeth and spaces in an opening in a work piece.

20. Structure as defined in claim 11 in which the pitch of said blades and annular groups is substantially less than one-half the thickness of a work piece for which the broach is designed.

No references cited.

WILLIAM W. DYER, JR., *Primary Examiner.*